(12) United States Patent
Ozawa (10) Patent No.: US 10,692,523 B2
(45) Date of Patent: Jun. 23, 2020

(54) MANUFACTURING METHOD OF MAGNETIC RECORDING MEDIUM

(71) Applicant: FUJIFILM Corporation, Tokyo (JP)

(72) Inventor: Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/037,520

(22) Filed: Jul. 17, 2018

(65) Prior Publication Data

US 2019/0027182 A1 Jan. 24, 2019

(30) Foreign Application Priority Data

Jul. 19, 2017 (JP) ................. 2017-140013

(51) Int. Cl.
*G11B 5/84* (2006.01)
*G11B 5/702* (2006.01)
*G11B 5/70* (2006.01)
*G11B 5/706* (2006.01)
*G11B 5/008* (2006.01)

(52) U.S. Cl.
CPC .......... *G11B 5/8404* (2013.01); *G11B 5/008* (2013.01); *G11B 5/70* (2013.01); *G11B 5/702* (2013.01); *G11B 5/70678* (2013.01); *G11B 5/84* (2013.01)

(58) Field of Classification Search
CPC ......... G11B 5/8404; G11B 5/008; G11B 5/70; G11B 5/702; G11B 5/70678; G11B 5/64
See application file for complete search history.

(56) References Cited

U.S. PATENT DOCUMENTS

| | | | |
|---|---|---|---|
| 5,689,384 A | 11/1997 | Albrecht et al. | |
| 7,283,320 B2* | 10/2007 | Tsujimoto | G11B 5/584 360/131 |
| 9,159,360 B2* | 10/2015 | Shiroishi | G11B 20/1217 |
| 2007/0253106 A1* | 11/2007 | Sato | G11B 5/02 360/125.02 |
| 2014/0340781 A1* | 11/2014 | Ajioka | G11B 5/012 360/59 |
| 2017/0316799 A1* | 11/2017 | Shimizu | G11B 5/012 |

* cited by examiner

*Primary Examiner* — Michael P Wieczorek
(74) *Attorney, Agent, or Firm* — Sughrue Mion, PLLC (57) ABSTRACT

Provided is a manufacturing method of a magnetic recording medium, in which the magnetic recording medium includes a magnetic layer including ferromagnetic powder and a binding agent on a non-magnetic support, and the magnetic layer shows a natural ferromagnetic resonance frequency equal to or greater than 30.0 GHz, the method including: forming a servo pattern on the magnetic layer by microwave-assisted recording.

6 Claims, 2 Drawing Sheets

MANUFACTURING METHOD OF MAGNETIC RECORDING MEDIUM

CROSS-REFERENCE TO RELATED APPLICATIONS

This application claims priority under 35 U.S.C 119 to Japanese Patent Application No. 2017-140013 filed on Jul. 19, 2017. The above application is hereby expressly incorporated by reference, in its entirety, into the present application.

BACKGROUND OF THE INVENTION

1. Field of the Invention

The present invention relates to a manufacturing method of a magnetic recording medium, specifically, a manufacturing method of a coating type magnetic recording medium having a servo pattern.

2. Description of the Related Art

In a magnetic recording medium, data information is normally recorded on a data band of the magnetic recording medium. Accordingly, data tracks are formed in the data band. As means for realizing high capacity of the magnetic recording medium, a technology of disposing a larger amount of data tracks on a magnetic layer of the magnetic recording medium by narrowing the width of the data track, to increase recording density is used. However, in a case where the width of the data track is narrowed and the recording and/or reproduction of data information is performed by transporting the magnetic recording medium in a drive, it is difficult that a magnetic head correctly follows the data tracks in accordance with the position change of the magnetic recording medium, and errors may easily occur at the time of recording and/or reproduction. Thus, as means for preventing occurrence of such errors, a technology of forming a servo pattern on the magnetic layer and performing head tracking servo has been recently proposed and practically used (for example, see U.S. Pat. No. 5,689,384A).

SUMMARY OF THE INVENTION

In magnetic servo type head tracking servo among head tracking servo systems, a servo pattern is formed on a magnetic layer of a magnetic recording medium, and this servo pattern is read by a servo head to perform head tracking servo. The head tracking servo is to control a position of a magnetic head in a drive. More specifically, the head tracking servo is performed as follows.

First, a servo head reads a servo pattern formed in a magnetic layer (that is, reproduces a servo signal). A position of a magnetic head in a drive is controlled in accordance with a value obtained by reading the servo pattern. Accordingly, in a case of transporting the magnetic recording medium in the drive for recording and/or reproducing data information, it is possible to increase an accuracy of the magnetic head following the data track, even in a case where the position of the magnetic recording medium is changed. For example, even in a case where the position of the magnetic tape is changed in a width direction with respect to the magnetic head, in a case of recording and/or reproducing data information by transporting the tape-shaped magnetic recording medium (that is, the magnetic tape) in the drive, it is possible to control the position of the magnetic head in the width direction of the magnetic tape in the drive, by performing the head tracking servo. By doing so, it is possible to correctly record data information on the magnetic tape and/or correctly reproduce data information recorded on the magnetic tape in the drive.

The servo pattern is formed by magnetizing a specific position of the magnetic layer, in the same manner as in the recording of the data information on the magnetic layer. In regards to the recording of the data information, high-density recording has been constantly required for the magnetic recording medium in accordance with an increase in information content. In order to achieve the high-density recording, a decrease in particle size of ferromagnetic powder (hereinafter, referred to as "atomization") included in the magnetic layer of the magnetic recording medium is effective. However, as the atomization of the ferromagnetic powder proceeds, thermal stability of magnetization decreases, and retention of recording decreases due to a so-called thermal fluctuation.

The point described above will be further described as follows. As an index for the thermal stability of magnetization, "KuV/kT" is known. Ku indicates an anisotropy constant of the ferromagnetic powder, V indicates a particle volume, k indicates a Boltzmann's constant, and T indicates an absolute temperature. By increasing the magnetic energy KuV with respect to thermal energy kT, that is, by increasing a value of "KuV/kT", it is possible to prevent an effect of thermal fluctuation (that is, improve the thermal stability of magnetization). However, it is necessary that the particle volume V is small, for realizing high-density recording. The magnetic energy is the product of Ku and V, and accordingly, in order to increase magnetization energy in a region having a small V, it is necessary to increase Ku. However, a switching magnetic field necessary for magnetization reversal increases, and accordingly, the ferromagnetic powder having a high Ku has high coercivity Hc. In order to record data information, strong external magnetic field is necessary and writing easiness is decreased. This decrease in writing easiness can also occur in the formation of the servo pattern (recording of the servo signal). That is, in a case where the strong external magnetic field is necessary for recording the data information, the strong external magnetic field is also necessary in the formation of the servo pattern, and thus, the writing easiness of the servo pattern also decreases.

Meanwhile, the magnetic recording media are widely divided into metal thin film type magnetic recording media and coating type magnetic recording media. A metal thin film type magnetic recording medium is a magnetic recording medium including a magnetic layer of a metal thin film formed by vapor evaporation. With respect to this, a coating type magnetic recording medium is a magnetic recording medium including a magnetic layer including ferromagnetic powder together with a binding agent. The coating type magnetic recording medium is a useful magnetic recording medium as a data storage medium for storing a large content of information for a long period of time, because chemical durability is more excellent than that of the metal thin film type magnetic recording medium.

In consideration of these circumstances, one aspect of the invention provides for a manufacturing method of a coating type magnetic recording medium having a servo pattern and capable of improving writing easiness of the servo pattern.

An aspect of the invention is to provide a manufacturing method of a magnetic recording medium, in which the magnetic recording medium includes a magnetic layer including ferromagnetic powder and a binding agent on a non-magnetic support, and the magnetic layer shows a natural ferromagnetic resonance frequency equal to or greater than 30.0 GHz, the method comprising: forming a servo pattern on the magnetic layer by microwave-assisted recording.

In one aspect, the ferromagnetic powder may be metal oxide powder.

In one aspect, the metal oxide powder may be ferrite powder.

In one aspect, the magnetic layer may be a single magnetic layer showing two or more different natural ferromagnetic resonance frequencies equal to or greater than 30.0 GHz.

In one aspect, the natural ferromagnetic resonance frequency may be 30.0 to 50.0 GHz.

According to one aspect of the invention, it is possible to improve writing easiness of the servo pattern on the coating type magnetic recording medium.

DESCRIPTION OF THE PREFERRED EMBODIMENTS

One aspect of the invention is a manufacturing method of a magnetic recording medium, in which the magnetic recording medium includes a magnetic layer including ferromagnetic powder and a binding agent on a non-magnetic support, and the magnetic layer shows a natural ferromagnetic resonance frequency equal to or greater than 30.0 GHz, the method including: forming a servo pattern on the magnetic layer by microwave-assisted recording (hereinafter, also referred to as a "manufacturing method of a magnetic recording medium" or simply as a "manufacturing method").

The magnetic recording medium is a magnetic recording medium including a magnetic layer including ferromagnetic powder and a binding agent on a non-magnetic support, that is, a coating type magnetic recording medium.

As described above, the magnetic recording media are widely divided into metal thin film type magnetic recording media and coating type magnetic recording media. As a drive on which a metal thin film type magnetic recording medium is mounted, a hard disk drive (HDD) is used. Regarding HDD, a recording system of applying a microwave magnetic field from a magnetic head, in a case of recording data information, and improving writing easiness (microwave-assisted recording) is proposed. With respect to this, regarding the recording of data information of the coating type magnetic recording medium, an application example of the microwave-assisted recording has not reported yet. In addition, regarding the formation of a servo pattern on the coating type magnetic recording medium, a possibility of application of the microwave-assisted recording has not been studied so far. With respect to this, in the manufacturing method of the magnetic recording medium according to one aspect of the invention, the servo pattern is formed on the magnetic layer of the coating type magnetic recording medium by microwave-assisted recording. Accordingly, it is possible to improve writing easiness of the servo pattern on the magnetic layer showing natural ferromagnetic resonance frequency equal to or greater than 30.0 GHz.

The ferromagnetic resonance is a phenomenon of a great precession of a magnetic moment (electron spin) of a ferromagnetic material, by applying microwave magnetic field having equivalent natural frequency. In the invention and the specification, the natural ferromagnetic resonance frequency" of the magnetic layer is an absorption peak frequency of a magnetic layer measured by vector network analyzer (VNA), in a case where an application magnetic field becomes zero, after saturating magnetization of the magnetic layer by applying an external magnetic field equal to or greater than saturation magnetic field to the magnetic layer in the same direction as the magnetization direction, in which the external magnetic field is necessary to be reversed. The description regarding the directions in the invention and the specification such as the "same direction" includes a range of errors allowed in the technical field of the invention. For example, in the errors, errors within approximately an angle of ±30° from an exact direction are allowed. The "magnetization direction" here is an average magnetization direction of magnetization directions of individual particles (ferromagnetic particles) of the ferromagnetic powder included in the magnetic layer. For example, in a case where an alignment process is performed with respect to the magnetic layer, in a case of manufacturing a magnetic recording medium, a direction of a magnetic field applied to the magnetic layer in the alignment process is generally an average magnetization direction of magnetization directions of individual particles. As a vector network analyzer, for example, a well-known vector network analyzer such as MS4647B or the like manufactured by Anritsu Corporation can be used. In addition, as a cable and/or a prober for connecting the magnetic layer and vector network analyzer at the time of the measuring, a cable and/or a prober configured with a member which is not affected by a magnetic field, even in a case of being disposed in the magnetic field, that is, a non-magnetic member is used. Regarding a measuring method of an absorption peak frequency using the vector network analyzer, for example, a description in Y. Nozaki, K. Tateishi, S. Taharazako, M. Ohta, S. Yoshimura, and K. Matsuyama, Applied Physics Letters, 91, 122505(2007); doi:10.1063/1.2786593 can be referred to. In addition, a description of examples which will be described later can be referred to.

In the invention and the specification, the "microwave" is an electromagnetic wave having a frequency of 300 MHz to 300 GHz. The "microwave-assisted recording" is a recording system of applying a microwave magnetic field to the magnetic layer to assist magnetization reversal of the ferromagnetic powder and form a magnetization pattern. In general, the formation of the servo pattern is also referred to as recording of a servo pattern or a servo signal, and reading of the servo pattern is also referred to as reproducing of a servo pattern or a servo signal.

Hereinafter, the manufacturing method of the magnetic recording medium will be further described in detail.

Magnetic Recording Medium

Magnetic Layer

Natural Ferromagnetic Resonance Frequency

In the manufacturing method, the natural ferromagnetic resonance frequency of the magnetic layer is equal to or greater than 30.0 GHz. On the magnetic layer showing the natural ferromagnetic resonance frequency equal to or greater than 30.0 GHz, a magnetization pattern, that is, a servo pattern can be formed by assisting magnetization reversal by a microwave magnetic field. That is, a servo pattern can be formed by the microwave-assisted recording. In addition, the magnetic layer showing the natural ferromagnetic resonance frequency equal to or greater than 30.0 GHz tends to be hardly affected by thermal fluctuation and has excellent thermal stability, and thus, the magnetic layer is preferable in order to prevent a change of servo pattern. A change of the servo pattern over time is due to a decrease in accuracy of controlling a position of a magnetic head by head tracking servo, and thus, it is preferable to prevent a change of the servo pattern over time, from a viewpoint of the improvement of the accuracy. In addition, excellent thermal stability is also preferable, from a viewpoint of improvement of retention of recording, regarding the recording of data information on the magnetic layer. The natural ferromagnetic resonance frequency of the magnetic layer is equal to or greater than 30.0 GHz, and can be, for example, equal to or smaller than 50.0 GHz or equal to or smaller than 40.0 GHz. However, the magnetic layer showing higher natural ferromagnetic resonance frequency tends to be hardly affected by the thermal fluctuation, and accordingly, the natural ferromagnetic resonance frequency of the magnetic layer may be greater than 50.0 GHz or greater than 40.0 GHz. Details of the natural ferromagnetic resonance frequency of the magnetic layer will be further described later.

The natural ferromagnetic resonance frequency of the magnetic layer can be controlled with coercivity Hc of the ferromagnetic powder included in the magnetic layer. The magnetic layer including ferromagnetic powder having higher coercivity Hc tends to show a higher natural ferromagnetic resonance frequency. Details of the coercivity Hc of the ferromagnetic powder will be described later.

Ferromagnetic Powder

The magnetic recording medium is a coating type magnetic recording medium and includes a magnetic layer including ferromagnetic powder and a binding agent. Examples of the ferromagnetic powder include powder of metal oxide such as hexagonal ferrite, ε-iron oxide, metal powder, alloy powder such as FePt or NdFeB, or powder of nitride such as $Fe_{16}N_2$. The natural ferromagnetic resonance frequency of the magnetic layer generally tends to increase, as the coercivity Hc of the ferromagnetic powder included in the magnetic layer is high. In one aspect, the coercivity Hc of the ferromagnetic powder is preferably equal to or greater than 210 kA/m. The coercivity Hc of the ferromagnetic powder can be, for example, 20,000 kA/m. However, the coercivity Hc thereof may be greater than 20,000 kA/m. In general, as the ferromagnetic powder has high coercivity Hc, the anisotropy constant Ku is high, and it is preferable from a viewpoint of thermal stability (retention of recording). The coercivity Hc of the ferromagnetic powder is a value obtained in a measurement environment of a temperature of 20° C. to 25° C. by a well-known magnetic properties measurement device such as an oscillation sample type magnetic-flux meter.

The atomization of the ferromagnetic powder included in the magnetic layer is preferable from a viewpoint of high-density recording. Regarding the particle size of the ferromagnetic powder, an average particle size of the ferromagnetic powder which is an index for a physical particle size is preferably equal to or smaller than 50 nm, more preferably equal to or smaller than 40 nm, even more preferably equal to or smaller than 35 nm, still preferably equal to or smaller than 30 nm, still more preferably equal to or smaller than 25 nm, and still even more preferably equal to or smaller than 20 nm, from a viewpoint of high-density recording. Meanwhile, the average particle size of the ferromagnetic powder is preferably equal to or greater than 5 nm and more preferably equal to or greater than 7 nm, from a viewpoint of stability of magnetization.

In the invention and the specification, the "average particle size" of various powder such as the ferromagnetic powder is a value measured by the following method by using a transmission electron microscope.

The powder is imaged with a transmission electron microscope at a magnification ratio of 100,000 and printed on printing paper so that the total magnification becomes 500,000, and an image of particles configuring the powder is obtained. Target particle is selected from the obtained image of the particles, an outline of the particle is traced with a digitizer, and a size of the particle (primary particle) is measured. The primary particle is an independent particle which is not aggregated.

The above measurement is performed regarding randomly extracted 500 particles. An arithmetical mean of the particle sizes of the 500 particles obtained as described above is an average particle size of the powder. As the transmission electron microscope, a transmission electron microscope H-9000 manufactured by Hitachi, Ltd. can be used, for example. In addition, the measurement of the particle size can be performed by using well-known image analysis software, for example, image analysis software KS-400 manufactured by Carl Zeiss.

In the invention and the specification, the average particle size of the ferromagnetic powder and the other powder is the average particle size obtained by the method described above.

As a method of collecting a sample powder from the magnetic recording medium in order to measure the particle size, a method disclosed in a paragraph 0015 of JP2011-48878A can be used, for example.

In the invention and the specification, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In a case of definition of the particle size (1), the average particle size is also referred to as an average long axis length, and in a case of the definition (2), the average particle size is also referred to as an average plate diameter. In a case of the definition (3), the average particle size is also referred to as an average diameter (also referred to as an average particle diameter).

In the invention and the specification, the ferromagnetic powder means an aggregate of a plurality of ferromagnetic particles. The aggregate not only includes an aspect in which particles configuring the aggregate are directly in contact with each other, but also includes an aspect in which a binding agent or an additive is interposed between the particles. The point described above is the same regarding various powder in the invention and the specification such as non-magnetic powder.

The content (filling percentage) of the ferromagnetic powder in the magnetic layer is preferably 50% to 90% by mass and more preferably 60% to 90% by mass. The components other than the ferromagnetic powder in the magnetic layer are at least a binding agent and one or more of additives may be further randomly included. A high filling percentage of the ferromagnetic powder in the magnetic layer is preferable from a viewpoint of improvement recording density of data information.

As the ferromagnetic powder, it is preferable to use ferromagnetic powder capable of showing high thermal stability (that is, hardly affected by thermal fluctuation), even in a case of being subjected to atomization for high-density recording. From this viewpoint, the ferromagnetic powder included in the magnetic layer is preferably metal oxide powder and more preferably ferrite powder among the metal oxide powders. Examples of the ferrite powder include various ferrite powders such as hexagonal ferrite powder and ε-iron oxide powder, and hexagonal ferrite powder and ε-iron oxide powder are preferable.

Regarding the hexagonal ferrite powder, a magnetoplumbite type (also referred to as an "M type"), a W type, a Y type, and a Z type are known as a crystal structure of the hexagonal ferrite. The hexagonal ferrite powder which can be used as the ferromagnetic powder of the magnetic layer may have any crystal structure. The coercivity Hc of the hexagonal ferrite powder can be, for example, controlled by the kinds and a compositional ratio of atoms configuring the crystal structure of the hexagonal ferrite. For example, the non-substitution type M-type hexagonal ferrite not including substitutional atoms is expressed by a composition formula: $AFe_{12}O_{19}$. The M-type hexagonal ferrite powder which is generally widely used in a magnetic recording field, is a substitution type M-type hexagonal ferrite in which a part of Fe in the composition formula is substituted with other atoms (substitutional atoms). Such a substitution type hexagonal ferrite tends to show lower coercivity Hc, compared to that of the non-substitution type hexagonal ferrite. Examples of the substitutional atoms include a niobium atom (Nb), a cobalt atom (Co), a titanium atom (Ti), and a zinc atom (Zn). However, there is no limitation thereto. Meanwhile, A in the composition formula represents a divalent metal atom. The divalent metal atom is a metal atom which may become divalent cations as ions, and examples thereof include a barium atom, a strontium atom, an alkali earth metal atom such as calcium atom, and a lead atom. As A, two or more divalent metal atoms may be included. For example, the hexagonal ferrite including a barium atom and a strontium atom as A is a mixed crystal of the barium ferrite and the strontium ferrite.

As the manufacturing method of the hexagonal ferrite powder, a glass crystallization method, a coprecipitation method, a reverse micelle method, a hydrothermal synthesis method, and the like are known. All of the manufacturing methods are well known. The manufacturing method of the hexagonal ferrite powder capable of being used as the ferromagnetic powder in the magnetic layer is not limited.

Meanwhile, regarding the ε-iron oxide powder, it is possible to control the coercivity He by substituting a part of iron atom (Fe) configuring the crystal structure with substitutional atoms such as Ga, Al, and Rh. Regarding the method of manufacturing the ε-iron oxide powder in which a part of Fe is substituted with substitutional atoms, a description disclosed in J. Jpn. Soc. Powder Metallurgy Vol. 61 Supplement, No. S1, pp. S280-S284, J. Mater. Chem. C, 2013, 1, pp. 5200-5206 can be referred, for example. However, the ε-iron oxide powder capable of being used as the ferromagnetic powder in the magnetic layer is not limited to ε-iron oxide powder obtained by the method disclosed in the document described above. As the manufacturing method of the ε-iron oxide powder, a manufacturing method from a goethite, a reverse micelle method, and the like are known. All of the manufacturing methods are well known. The manufacturing method of the ε-iron oxide powder capable of being used as the ferromagnetic powder in the magnetic layer is not limited.

Binding Agent

The magnetic layer includes a binding agent together with the ferromagnetic powder. The binding agent is one or more kinds of resin and the resin may be a homopolymer or a copolymer. As the binding agent included in the magnetic layer, a resin selected from a polyurethane resin, a polyester resin, a polyamide resin, a vinyl chloride resin, styrene, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight of the invention and the specification is a value measured by gel permeation chromatography (GPC) and obtained by standard polystyrene conversion. As the measurement conditions, the following conditions can be used.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

Additives

The magnetic layer can include one or more kinds of additives, if necessary. As an example of the additives, a curing agent can be used together with a resin capable of being used as the binding agent, at the time of forming the magnetic layer, for example. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

In addition, examples of the additives included in the magnetic layer include non-magnetic powder, a lubricant, a dispersing agent, a dispersing assistant, an antibacterial agent, an antistatic agent, an antioxidant, and carbon black which can function as an abrasive or a projection formation agent. As various additives, a commercially available product can be suitably selected according to the desired properties or manufactured by a well-known method, and can be used with any amount.

Non-Magnetic Layer

Next, the non-magnetic layer will be described.

The magnetic recording medium may directly include a magnetic layer on a non-magnetic support, or may include a non-magnetic layer including non-magnetic powder and a binding agent between the non-magnetic support and the magnetic layer. The non-magnetic powder included in the non-magnetic layer may be inorganic powder or organic powder. In addition, carbon black and the like can be used. Examples of the inorganic powder include metal, metal oxide, metal carbonate, metal sulfate, metal nitride, metal carbide, and metal sulfide. These non-magnetic powders can be purchased as a commercially available product or can be manufactured by a well-known method. For details thereof, a description disclosed in paragraphs 0036 to 0039 of JP2010-24113A can be referred to.

In regards to details of the binding agent of the non-magnetic layer or additives which can be randomly included therein, the well-known technology regarding the magnetic layer and/or the non-magnetic layer can be applied. In addition, carbon black and/or organic powder can also be added to the non-magnetic layer.

For those, a description disclosed in paragraphs 0040 to 0042 of JP2010-24113A can be referred to.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used.

Among these, polyethylene terephthalate, polyethylene naphthalate, and polyamide are preferable.

Corona discharge, plasma treatment, easy-bonding treatment, or heat treatment may be performed with respect to these supports in advance.

Thickness of Non-Magnetic Support and Each Layer

Among thicknesses of the non-magnetic support and various layers of the magnetic tape, a thickness of the non-magnetic support is preferably 3.0 to 80.0 μm, more preferably 3.0 to 20.0 μm, and even more preferably 3.0 to 10.0 μm.

A thickness of the magnetic layer can be optimized according to a saturation magnetization amount of a magnetic head used, a head gap length, a recording signal band, and the like. The thickness of the magnetic layer is normally 5 to 200 nm, preferably 10 to 150 nm, more preferably 10 to 120 nm, even more preferably 10 to 80 nm, and still more preferably 10 to 30 nm.

In one aspect, the magnetic recording medium can be a magnetic recording medium including only one layer of the magnetic layer (that is, a single magnetic layer). In this case, the single magnetic layer may show only one natural ferromagnetic resonance frequency equal to or greater than 30.0 GHz, or may show two or more natural ferromagnetic resonance frequencies equal to or greater than 30.0 GHz. For example, by forming the magnetic layer by using ferromagnetic powder collected from two kinds of ferromagnetic powder lots having different coercivity Hc, it is possible to obtain a coating type magnetic recording medium including a single magnetic layer showing two natural ferromagnetic resonance frequencies equal to or greater than 30.0 GHz. According to the microwave-assisted recording, two or more different information items can be recorded (that is, multiple recording) on the single magnetic layer, by using the fact that the single magnetic layer shows two natural ferromagnetic resonance frequencies equal to or greater than 30.0 GHz. This point will be further described below. The "two or more different information items" are two or more information series independent from each other. The two or more information series independent from each other may be configured with only a plurality of different head tracking servo information items, or may be configured with one or more head tracking servo information items and one or more data information items. The data information is various information items such as character information or image information recorded on the magnetic layer of the magnetic recording medium. Meanwhile, the head tracking servo information is configured with the shape of the servo pattern for performing the head tracking servo and disposition of the plurality of servo patterns.

Hereinafter, a case where the single magnetic layer shows natural ferromagnetic resonance frequencies $\alpha$ and $\beta$ ($\alpha \neq \beta$) equal to or greater than 30.0 GHz, and this single magnetic layer include two kinds of ferromagnetic powders of ferromagnetic powder in which magnetization reversal is assisted by applying a microwave magnetic field at a frequency A (hereinafter, also referred to as "ferromagnetic powder $\alpha$"); and ferromagnetic powder in which magnetization reversal is assisted by applying a microwave magnetic field at a frequency B (hereinafter, also referred to as "ferromagnetic powder $\beta$"), will be described as an example. The natural ferromagnetic resonance frequency $\alpha$ is derived from the ferromagnetic powder $\alpha$ and the natural ferromagnetic resonance frequency $\beta$ is derived from the ferromagnetic powder $\beta$. The ferromagnetic powder $\alpha$ and the ferromagnetic powder $\beta$ are generally ferromagnetic powders collected from ferromagnetic powder lots having different coercivity Hc. The microwave magnetic field is applied in a direction opposite to the magnetization direction before the magnetization reversal, in order to assist the magnetization reversal. A value of a frequency in the microwave magnetic field depends on a magnetic field strength of the microwave magnetic field, and as the magnetic field strength increases, the frequency decreases. The ferromagnetic powder $\alpha$ and the ferromagnetic powder $\beta$ have different frequencies at which the magnetization reversal is assisted. In order to assist the magnetization reversal of the ferromagnetic powder $\alpha$, a microwave magnetic field at a frequency which is preferably equal to or lower than the natural ferromagnetic resonance frequency $\alpha$, and more preferably lower than the natural ferromagnetic resonance frequency $\alpha$, is applied. In order to assist the magnetization reversal of the ferromagnetic powder $\beta$, a microwave magnetic field at a frequency which is preferably equal to or lower than the natural ferromagnetic resonance frequency $\beta$, and more preferably lower than the natural ferromagnetic resonance frequency $\beta$, is applied. Accordingly, the frequency A is preferably equal to or less than the natural ferromagnetic resonance frequency $\alpha$ and more preferably lower than $\alpha$. The frequency $\beta$ is preferably equal to or less than the natural ferromagnetic resonance frequency $\beta$ and more preferably lower than $\beta$. $A \neq B$, and thus, the magnetization reversal of the ferromagnetic powder $\beta$ is not assisted by applying the microwave magnetic field of the frequency A, in order to assist the magnetization reversal of the ferromagnetic powder $\alpha$, and the magnetization reversal of the ferromagnetic powder α is not assisted by applying the microwave magnetic field of the frequency B, in order to assist the magnetization reversal of the ferromagnetic powder β.

By using the properties described above, two different information items (hereinafter, referred to as "information α and information β) can be recorded on the single magnetic layer. Specific description is as follows. In a case where a recording magnetic field corresponding to the "information α" is applied to the magnetic layer including the ferromagnetic powder α and the ferromagnetic powder β, and a microwave magnetic field of the frequency A capable of assisting the magnetization reversal of the ferromagnetic powder α is applied, the magnetization reversal of the ferromagnetic powder α is assisted, and accordingly, the magnetization reversal of the ferromagnetic powder α occurs, and the information α can be recorded in the ferromagnetic powder α. Here, since the magnetization reversal of the ferromagnetic powder β is not assisted, the information α is not recorded in the ferromagnetic powder β. In contrast, in a case where a recording magnetic field corresponding to the "information β" is applied to the magnetic layer including the ferromagnetic powder α and the ferromagnetic powder β, and a microwave magnetic field of the frequency B capable of assisting the magnetization reversal of the ferromagnetic powder β is applied, the magnetization reversal of the ferromagnetic powder β is assisted, and accordingly, the magnetization reversal of the ferromagnetic powder β occurs, and the information β can be recorded in the ferromagnetic powder β. Here, since the magnetization reversal of the ferromagnetic powder α is not assisted, the information β is not recorded in the ferromagnetic powder α. By doing so, it is possible to perform multiple recording of two different information items on the single magnetic layer (same magnetic layer).

In the example described above, the example of performing multiple recording of two different information items has been described. However, the multiple-recorded information items are not limited to two information items and may be three information items, four information items, or five or more information items (for example, 5 to 10 information items). By performing microwave-assisted recording by applying a microwave magnetic field at different frequencies, it is possible to perform the multiple recording of information items on the single magnetic layer, the number of which is the same as the number of natural ferromagnetic resonance frequencies of this magnetic layer. With respect to this, in the metal thin film type magnetic recording medium, a single magnetic layer showing two or more natural ferromagnetic resonance frequencies is hardly formed due to a manufacturing reason of formation of the magnetic layer by vapor evaporation and the like. Accordingly, in order to perform the multiple recording of two or more different information items on the same metal thin film type magnetic recording medium by the microwave-assisted recording, a multilayered magnetic layer having two or more layers showing different natural ferromagnetic resonance frequencies is provided. In contrast, according to the coating type magnetic recording medium, multiple recording can be performed on the single magnetic layer by the microwave-assisted recording as described above. Accordingly, for example, different head tracking servo information items can be recorded on the same region of the single magnetic layer. In addition, for example, servo patterns are formed in the same region or different regions of the single magnetic layer by the microwave-assisted recording, and data information can be recorded by the microwave-assisted recording.

However, an aspect of including the multilayered magnetic layer having two or more layers is not removed from the magnetic recording medium manufactured in the manufacturing method according to one aspect of the invention. For example, in the magnetic recording medium according to one aspect of the invention, the magnetic layer may be separated to two or more layers having different magnetic properties, and a configuration regarding a well-known multilayered magnetic layer can be applied. Regarding the multilayered magnetic layer, the thickness of the magnetic layer is a total thickness of the plurality of magnetic layers. In this case, different magnetic layers may show different natural ferromagnetic resonance frequencies or may show the same natural ferromagnetic resonance frequency.

The thickness of the non-magnetic layer is, for example, 0.05 to 3.0 μm, preferably 0.1 to 2.0 μm, and even more preferably 0.1 to 1.5 μm. In the invention and the specification, the "non-magnetic layer" includes a substantially non-magnetic layer including a small amount of ferromagnetic powder as impurities or intentionally, together with the non-magnetic powder. Here, the "substantially non-magnetic layer" is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic recording medium can also include a back coating layer on a side of the non-magnetic support opposite to a side including the magnetic layer. The back coating layer preferably includes carbon black and/or inorganic powder. In regards to the binding agent and various additives for forming the back coating layer, a well-known technology regarding the magnetic layer, the non-magnetic layer, and the back coating layer can be applied. The thickness of the back coating layer is preferably equal to or smaller than 0.9 μm and more preferably 0.1 to 0.7 μm.

Manufacturing Step of Magnetic Recording Medium in Which Servo Pattern is Formed A step of preparing a composition for forming a magnetic layer, a non-magnetic layer, or a back coating layer generally includes at least a kneading step, a dispersing step, and a mixing step provided before and after these steps, if necessary. Each step may be divided into two or more stages. Various components may be added at an initial stage or in a middle stage of each step. In addition, each component may be separately added in two or more steps. For example, a binding agent may be separately added in a kneading step, a dispersing step, and a mixing step for adjusting viscosity after the dispersion. In order to manufacture the magnetic recording medium, a well-known manufacturing technology of the related art can be used in some or all of the steps. For example, in the kneading step, an open kneader, a continuous kneader, a pressure kneader, or a kneader having a strong kneading force such as an extruder is preferably used. For the details of these kneading processes, descriptions disclosed in JP1989-106338A (JP-H01-106338A) and JP1989-79274A (JP-H01-79274A) can be referred to. In order to disperse the composition for forming each layer, glass beads can be used as dispersion beads. As the dispersion beads, zirconia beads, titania beads, and steel beads which are dispersion beads having high specific gravity are suitable. These dispersion beads can be used by optimizing a particle diameter and a filling percentage of these dispersion beads. As a disperser, a well-known disperser can be used. Each layer forming composition may be filtered by a well-known method before performing the coating step. The filtering can be performed by filter filtering, for example. As the filter used in the filtering, a filter having a hole diameter of 0.01 to 3 µm (for example, filter made of glass fiber or filter made of polypropylene) can be used, for example.

For details of the manufacturing method of the magnetic recording medium, a description disclosed in paragraphs 0051 to 0057 of JP2010-24113A can be referred to, for example.

The shape of the magnetic recording medium is not limited. The magnetic recording medium may be a tape-shaped magnetic recording medium (magnetic tape) or may be a disk-shaped magnetic recording medium (magnetic disk). In addition, as shown in examples which will be described later, the magnetic recording medium may have a configuration in which a sliding part with a magnetic head is not included and a waveguide path and a magnetic layer are integrally formed on a non-magnetic support (for example, a silicon substrate).

Forming Step of Servo Pattern

The servo pattern is formed on the magnetic layer by magnetizing a specific position of the magnetic layer by a servo pattern recording head (referred to as a "servo write head"). In a case of applying a recording magnetic field corresponding to head tracking servo information which should be recorded on the magnetic layer to the magnetic layer, by using a head capable of performing microwave-assisted recording as this servo write head, the magnetization reversal of the ferromagnetic powder, which does not perform magnetization reversal by applying of the recording magnetic field, is assisted by applying a microwave magnetic field, and thus, the magnetization reversal of the ferromagnetic powder occurs, and a servo pattern can be formed. Such an assist of the magnetization reversal can be realized by setting the ferromagnetic powder included in the magnetic layer in a resonance state. In order for that, it is preferable to apply the microwave magnetic field at the same frequency as or the frequency in the vicinity of the natural ferromagnetic resonance frequency of the magnetic layer to the magnetic layer. In a case where the natural ferromagnetic resonance frequency of the magnetic layer is set as "X" GHz, it is more preferable to apply the microwave magnetic field at a frequency of (X-15.0) GHz to X GHz, and it is even more preferable to apply the microwave magnetic field at a frequency equal to or higher than (X-15.0) GHz and lower than X GHz. In addition, in a case where the single magnetic layer shows two or more different natural ferromagnetic resonance frequencies other than 30.0 GHz, the different natural ferromagnetic resonance frequencies are preferably different from each other by 5.0 GHz or more (for example, 5.0 GHz to 10.0 GHz), from a viewpoint of performing multiple recording described above in an excellent manner.

The servo write head capable of performing the microwave-assisted recording includes at least a servo pattern forming unit (recording unit). The servo pattern forming unit has a configuration of including a recording electrode and a counter electrode generating the recording magnetic field and further including a microwave oscillation element generating the microwave magnetic field. The microwave magnetic field is preferably generated as an alternating field by a direct current. A frequency of the alternating field is proportional to a current value of a direct current. Accordingly, by adjusting a current value of a direct current, it is possible to control the frequency of the microwave magnetic field applied to the magnetic layer. As the microwave oscillation element, a microwave oscillation element of applying a static magnetic field may be used. Alternatively, dynamic recording may be performed by using a spin torque oscillator. One or two or more microwave oscillation elements may be included in the servo pattern forming unit. In a case of applying the microwave magnetic field at two or more different frequencies to the magnetic layer by the servo write head, the applying of the microwave magnetic field having different frequencies may be performed at the same time or sequentially, or is preferably sequentially performed.

In addition, the reading of the servo pattern formed on the magnetic layer can be performed by measuring an absorption peak frequency, as shown in examples which will be described later, for example. Alternatively, an element capable of performing magnetic field detection, for example, a hall element, a magnetoresistive (MR) element, a giant-magnetoresistive (GMR) element, a tunnel-magnetoresistive (TMR) element, and the like can also be used as a reproducing unit. In addition, in order to read the servo pattern which is multiple-recorded as described above, for example, a reading unit using the spin torque oscillator can also be used. For the reading of the servo pattern using the spin torque oscillator, a description disclosed in Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012) can be referred to, for example.

for the recording of data information, examples of a recording system of the magnetic recording include vertical recording and longitudinal recording. In a case where the ferromagnetic powder included in the magnetic layer is hexagonal ferrite powder, it is preferable to set an easy-magnetization axis in a direction orthogonal to the surface of the magnetic layer, from a viewpoint of reducing an effect of demagnetization caused by a diamagnetic field. Accordingly, it is preferable to perform the vertical recording. In contrast, in a case where the ferromagnetic powder included in the magnetic layer is ε-iron oxide powder, it is preferable to set an easy-magnetization axis in a direction vertical to the surface of the magnetic layer, and it is also preferable to set the easy-magnetization axis in a direction vertical to the vertical direction (a longitudinal direction in a magnetic tape, and a radius direction in a magnetic disk). It is because, the ε-iron oxide powder has comparatively small magnetization and comparatively great coercivity, compared to those of the hexagonal ferrite powder, and thus, it is hardly affected by the demagnetization due to a diamagnetic field. In the magnetic tape, the longitudinal recording tends to be useful for improving output. The above description is also applied to the formation and reading of the servo pattern.

A shape of the servo pattern formed on the magnetic layer of the magnetic recording medium and disposition thereof for realizing the head tracking servo are well known. In regards to the shape of the servo pattern formed on the magnetic layer of the magnetic recording medium and disposition thereof, a well-known technology can be used. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

Hereinafter, as one specific aspect of the head tracking servo, head tracking servo in the timing-based servo system will be described. However, the head tracking servo performed in the magnetic recording medium manufactured by the manufacturing method of the magnetic recording medium according to one aspect of the invention is not limited to the following specific aspect.

In the head tracking servo in the timing-based servo system (hereinafter, referred to as a "timing-based servo"), a plurality of servo patterns having two or more different shapes are formed on a magnetic layer, and a position of a servo head is recognized by an interval of time in a case where the servo head has read two servo patterns having different shapes and an interval of time in a case where the servo head has read two servo patterns having the same shapes. The position of the magnetic head in the width direction of the magnetic tape is controlled based on the position of the servo head recognized as described above. In one aspect, the magnetic head, the position of which is controlled here, is a magnetic head (reproducing head) which reproduces data information recorded on the magnetic tape, and in another aspect, the magnetic head is a magnetic head (recording head) which records data information in the magnetic tape.

Figure 1:
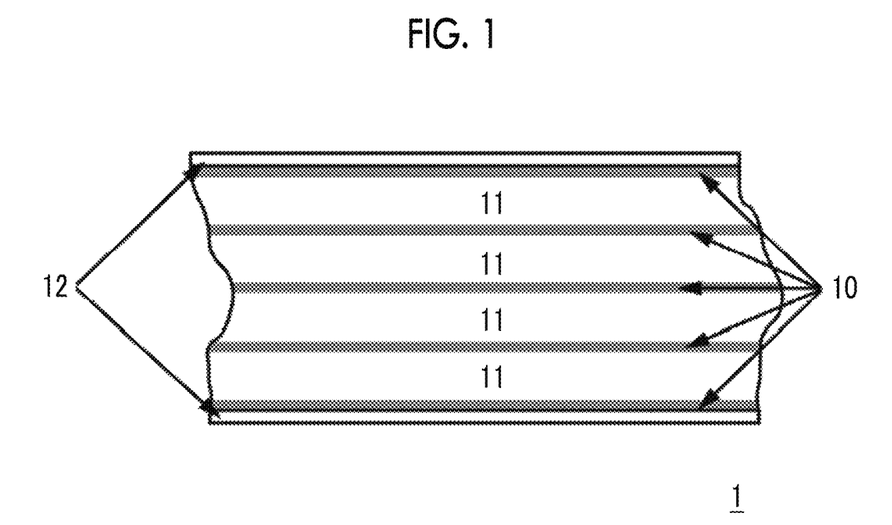
FIG. 1 shows an example of disposition of data bands and servo bands.
Figure 2:
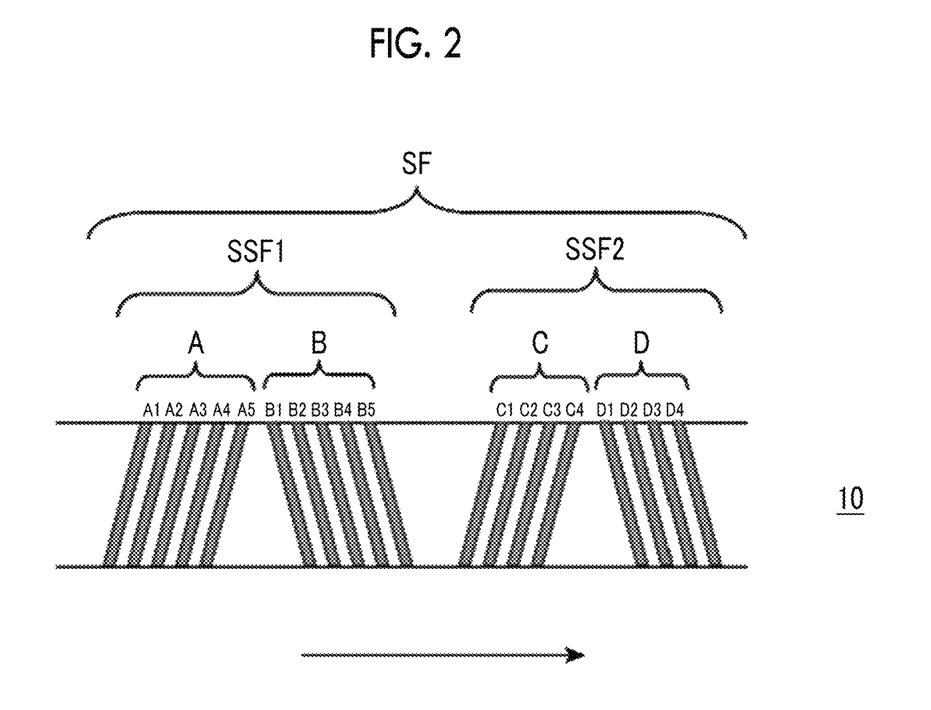
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the drive.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

For details of the head tracking servo of the timing-based servo system, for example, well-known technologies such as technologies disclosed in U.S. Pat. Nos. 5,689,384A, 6,542,325B, and 7,876,521B can be used. In addition, for the details of the head tracking servo in the amplitude-based servo system, well-known technologies disclosed in U.S. Pat. Nos. 5,426,543A and 5,898,533A can be used.

In addition, according to one aspect of the invention, it is possible to provide a magnetic recording medium which is used for forming a servo pattern by the microwave-assisted recording, includes a magnetic layer including ferromagnetic powder and a binding agent on a non-magnetic support, and in which the magnetic layer shows natural ferromagnetic resonance frequency equal to or greater than 30.0 GHz. Details of such a magnetic recording medium are as described above.

According to one aspect of the invention, it is also possible to provide a magnetic recording and reproducing device including the magnetic recording medium manufactured by the manufacturing method, a servo head, and a magnetic head. The magnetic recording and reproducing device is generally called a drive, and is not limited to a device which performs recording and reproducing of data information, and includes a device which only performs recording of data information and a device which only performs reproducing of data information.

As a magnetic head, a well-known magnetic head capable of recording data information on a magnetic recording medium and/or reproducing the data information can be used. A recording head and a reproduction head may be one magnetic head or may be separated magnetic heads. In addition, the recording head may be a magnetic head which performs recording of data information without performing the microwave-assisted recording, or may be a magnetic head which performs recording of data information by the microwave-assisted recording. For the magnetic head which performs recording of data information by the microwave-assisted recording, the above description regarding the servo write head for performing the microwave-assisted recording can be referred to.

As the servo head, a well-known servo head capable of reading a servo pattern formed on the magnetic layer of the magnetic recording medium can be used. At least one or two or more servo heads may be included in the magnetic recording and reproducing device. In addition, a servo pattern reading element may be included in the magnetic head including an element for recording data information and/or an element for reproducing the data information. That is, the magnetic head and the servo head may be a single head.

In regards to the reproducing of information subjected to multiple recording, a method of reproducing information recorded on a multilayered film having different absorption peak frequencies is disclosed in T. Yang, H. Suto, T. Nagasawa, K. Kudo, K. Mizushima, R. Sato, "Journal of Magnetism and Magnetic Materials" 332 (2013), pp. 52-55. Such a reproducing method can also be used for reading of the servo pattern which is multiple-recorded on the magnetic recording medium including the different ferromagnetic powders in the same single magnetic layer.

Examples

Hereinafter, the invention will be further described with reference to the examples. However, the invention is not limited to the aspect shown in the examples.

1. Ferromagnetic Powder

The following magnetic recording medium sample was manufactured and evaluated by using four kinds of ferromagnetic powders shown in Table 1. The ferromagnetic powder shown in Table 1 is hexagonal ferrite powder manufactured by a glass crystallization method.

The coercivity shown in Table 1 was measured at an applying magnetic field of 1194 kA/m (15 kOe) by using an oscillation sample type magnetic-flux meter (manufactured by Toei Industry Co., Ltd.).

TABLE 1

| Ferromagnetic powder No. | Coercivity Hc |
|---|---|
| A | 193 [kA/m] |
| B | 206 [kA/m] |
| C | 246 [kA/m] |
| D | 227 [kA/m] |

2. Manufacturing of Magnetic Recording Medium Sample

Magnetic recording medium samples No. 1 to 4 were manufactured by the following method.

Each hexagonal ferrite powder shown in Table 1 was added to and dispersed in an ultraviolet-curable resin composition (photoresist MICROPOSIT S1813G manufactured by The Dow Chemical Company) which is a binding agent-containing composition to prepare a magnetic layer forming composition. The prepared magnetic layer forming composition was applied to a thermal oxide film-attached silicon substrate by spin coating (thickness after drying: 150 nm), homeotropic alignment process was performed by applying a magnetic field in a vertical direction with respect to a coating surface, and the coating surface was dried. After the drying, mask exposing and developing were performed, patterning was performed in a rectangular shape, and a magnetic layer was formed.

3. Measurement of Natural Ferromagnetic Resonance Frequency

A $SiO_2$ film having a thickness of 100 nm was formed on a magnetic layer of the magnetic recording medium sample manufactured in the section 2. by a sputtering method, and a planar waveguide in which a Ti film having a thickness of 5 nm and an Au film having a thickness of 300 nm were laminated was formed by a lift-off technology.

Figure 3:
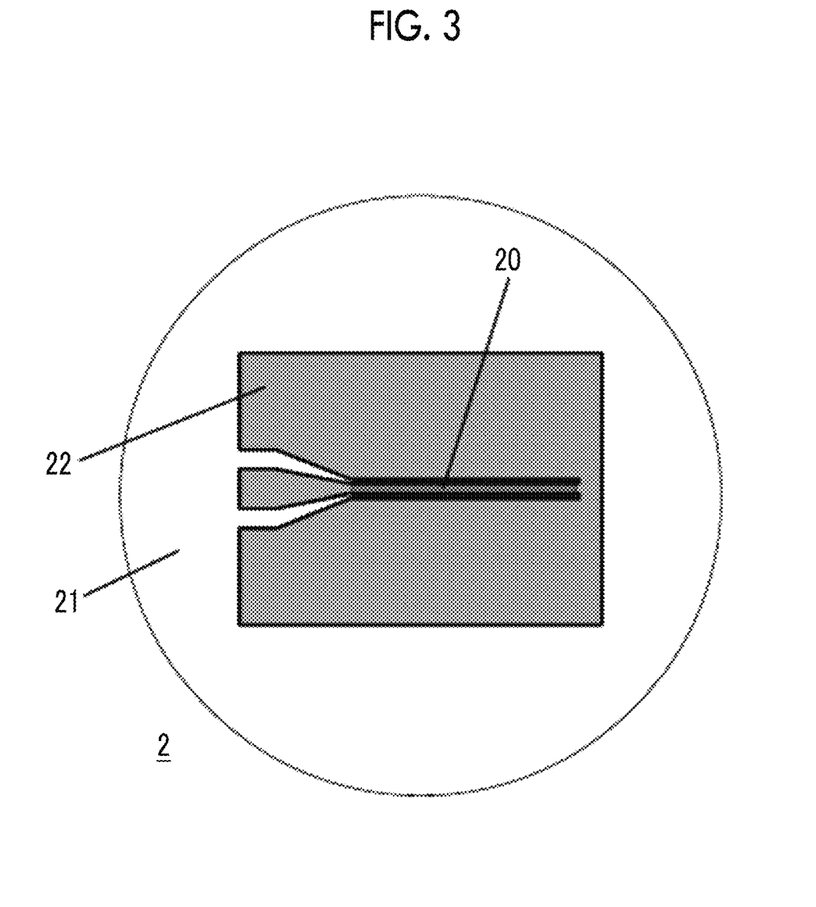
FIG. 3 is a schematic view of a magnetic recording medium sample manufactured in examples.

FIG. 3 shows a schematic view of the magnetic recording medium sample in which the planar waveguide is formed as described above. A magnetic recording medium sample 2 shown in FIG. 3 includes a magnetic layer 20 on a silicon substrate 21, and a planar waveguide 22 is formed.

The natural ferromagnetic resonance frequency of the magnetic layer of each magnetic recording medium sample was measured by using MS4647B manufactured by Anritsu Corporation as a vector network analyzer, and by using a non-magnetic member as a cable and a prober. The absorption peak frequency which will be described later was also measured in the same manner. The natural ferromagnetic resonance frequency is obtained as an absorption peak frequency of a magnetic layer measured by a vector network analyzer, in a case where the applying magnetic field becomes zero, after saturation of magnetization of the magnetic layer by applying a magnetic field of 1034.8 kA/m (13 kOe) in a positive direction, in a case where the silicon substrate side of the magnetic layer in the thickness direction is set as a negative direction and the other side is set as a positive direction. Table 2 shows the measured natural ferromagnetic resonance frequency.

TABLE 2

| Magnetic recording medium sample No. | Ferromagnetic powder No. | Natural ferromagnetic resonance frequency [GHz] |
|---|---|---|
| 1 | A | 25.8 |
| 2 | B | 28.8 |
| 3 | C | 30.1 |
| 4 | D | 38.5 |

4. Microwave-Assisted Recording of Magnetic Recording Medium Sample No. 3

In a case where an external magnetic field at a magnetic field strength equal to or smaller than the coercivity of the ferromagnetic powder included in the sample is applied to each magnetic recording medium sample shown in Table 2, the absorption peak frequency increases, in a case where the direction of the external magnetic field and the magnetization direction of the ferromagnetic powder in the magnetic layer are the same direction, and the absorption peak frequency decreases, in a case where the directions are reverse directions. That is, it is possible to confirm the magnetization direction of the ferromagnetic powder (that is, whether or not the magnetization reversal occurs), in accordance with a degree of a change of the absorption peak frequency from the natural ferromagnetic resonance frequency, by applying the external magnetic field equal to or smaller than coercivity of the ferromagnetic powder included in each magnetic recording medium sample. Specifically, occurrence or non-occurrence of the magnetization reversal was confirmed, by applying the magnetic field (recording magnetic field) having magnetic field strength of 159.2 kA/m (2 kOe) in the negative direction, after the saturation by applying the magnetic field of the magnetization of the magnetic layer of each magnetic recording medium sample in the positive direction.

As a result, in the magnetic recording medium samples No. 1 and No. 2, the magnetization reversal occurs in a part of the ferromagnetic powder, and the absorption frequency was also confirmed at a frequency higher than the natural ferromagnetic resonance frequency.

In contrast, in the magnetic recording medium samples No. 3 and No. 4, the magnetization reversal of the ferromagnetic powder does not occur, and the absorption frequency was confirmed only at a frequency lower than natural ferromagnetic resonance frequency.

Next, in the magnetic recording medium sample No. 3, in a state where the magnetization of the magnetic layer was saturated by applying the magnetic field in the positive direction and the magnetic field (recording magnetic field) having magnetic field strength of 159.2 kA/m (2 kOe) is applied in the negative direction, the microwave magnetic field at a frequency of 26.5 GHz was applied for 100 ns (nanoseconds) through an amplifier. After that, in a case where the absorption peak frequency of the magnetic layer was measured, the measured absorption peak frequency was 35.0 GHz and was a frequency higher than the natural ferromagnetic resonance frequency (30.1 GHz) of the magnetic layer of the magnetic recording medium sample No. 3. From this, it is possible to confirm that, in the magnetic recording medium sample No. 3 in which magnetization reversal (recording of information) does not occur only by applying the recording magnetic field having the magnetic field strength of 159.2 kA/m (2 kOe), the magnetization reversal was assisted by applying of the microwave magnetic field, and the magnetization reversal occurred (information was recorded). In the example described above, the recording magnetic field is applied in a thickness direction of the magnetic layer, and thus, the recording system is the vertical recording.

As described above, it is shown that information can be recorded by the microwave-assisted recording of the information on the magnetic layer showing the natural ferromagnetic resonance frequency equal to or greater than 30.0 GHz. The information recorded as described above is set as head tracking servo information, that is, a servo pattern is formed to have the shape and disposition determined based on the standard, and thus, it is possible to manufacture a magnetic recording medium having the servo pattern formed by the microwave-assisted recording on the magnetic layer.

5. Manufacturing of Magnetic Recording Medium Sample No. 5 for Multiple Recording The magnetic recording medium sample No. 5 was manufactured in the same manner as in a case of the magnetic recording medium sample No. 3, except that a half amount (based on mass) of ferromagnetic powder No. C was changed with ferromagnetic powder No. D. The magnetic recording medium sample No. 5 is ferromagnetic powder No. C having the content of ferromagnetic powder of 50% by mass, and 50% by mass thereof is the ferromagnetic powder No. D.

The natural ferromagnetic resonance frequency of the magnetic recording medium sample No. 5 was measured by the method described in the section 3, and two natural ferromagnetic resonance frequencies of 30.1 GHz and 38.5 GHz were confirmed. With comparison with the natural ferromagnetic resonance frequency of the magnetic recording medium samples No. 3 and No. 4 including only the one kind of ferromagnetic powder shown in Table 2, it is possible to confirm that the natural ferromagnetic resonance frequency of 30.1 GHz was derived from the ferromagnetic powder No. C, and the natural ferromagnetic resonance frequency of 38.5 GHz was derived from the ferromagnetic powder No. D.

6. Microwave-Assisted Recording of Magnetic Recording Medium Sample No. 5

In the magnetic recording medium sample No. 5, in a case where the magnetization of the magnetic layer was saturated by applying the magnetic field in the positive direction and the magnetic field (recording magnetic field) having a magnetic field strength of 159.2 kA/m (2 kOe) was applied in the negative direction, two absorption frequencies of 26.5 GHz and 34.0 GHz which are frequencies lower than the natural ferromagnetic resonance frequencies (30.1 GHz and 38.5 GHz were confirmed. As a result, in the magnetic recording medium sample No. 5, it is possible to confirm that magnetization reversal (recording of information) did not occur only by applying the recording magnetic field strength of 159.2 kA/m (2 kOe).

Next, in the magnetic recording medium sample No. 5, in a state where the magnetization of the magnetic layer was saturated by applying the magnetic field in the positive direction and the magnetic field (recording magnetic field) having magnetic field strength of 159.2 kA/m (2 kOe) is applied in the negative direction, the microwave magnetic field at a frequency of 26.5 GHz was applied for 100 ns (nanoseconds) through an amplifier. After that, in a case where the absorption peak frequency of the magnetic layer was measured, the absorption peak frequency was only confirmed in the vicinity of the frequency of 35.0 GHz. It is thought that the absorption peak frequency 35.0 GHz is derived from appearance of an absorption peak frequency changed from the natural ferromagnetic resonance frequency (30.1 GHz) derived from the ferromagnetic powder No. C, and the natural ferromagnetic resonance frequency (38.5 GHz) derived from the ferromagnetic powder No. D in substantially the same frequency domain. From this viewpoint, it is possible to confirm that the magnetization reversal of the ferromagnetic powder No. C was selectively performed by applying the microwave magnetic field, that is, information is selectively recorded on the ferromagnetic powder No. C. In addition, it is possible to cause the ferromagnetic powder No. D to selectively perform the magnetization reversal by assisting the magnetization reversal by applying the microwave magnetic field at a frequency different from the frequency of the microwave magnetic field to the magnetic recording medium sample No. 5. In a case where the ferromagnetic powder No. D selectively performs the magnetization reversal, information is recorded by applying the magnetic field (recording magnetic field) which is different from that in a case of causing the ferromagnetic powder No. C to selectively perform the magnetization reversal, and thus, different information items can be recorded on the same single magnetic layer.

As described above, it was found that multiple recording can be performed by performing the microwave-assisted recording on the magnetic layer showing the natural ferromagnetic resonance frequency equal to or greater than 30.0 GHz. By setting at least one information item subjected to the multiple recording as described above as head tracking servo information, that is, by forming a servo pattern with the shape and the disposition determined by the standard, it is possible to manufacture a magnetic recording medium having a servo pattern formed by the microwave-assisted recording on the magnetic layer.

In the example described above, a thermal oxide film-attached silicon substrate was used as the non-magnetic support, and a magnetic recording medium sample in which a single magnetic layer was formed on this non-magnetic support was used. However, this is merely an example, and, in the manufacturing method according to one aspect of the invention, the magnetic recording medium in which a servo pattern is formed can have various configurations including a magnetic layer showing the natural ferromagnetic resonance frequency equal to or greater than 30.0 GHz directly on the non-magnetic support, or indirectly through a non-magnetic layer.

One aspect of the invention can be effective in the technical fields of magnetic recording mediums for high-density recording.

What is claimed is:

1. A manufacturing method of a magnetic recording medium, in which the magnetic recording medium includes a magnetic layer including two or more different kinds of ferromagnetic powder and a binding agent on a non-magnetic support, and the magnetic layer shows two or more different natural ferromagnetic resonance frequencies equal to or greater than 30.0 GHz, the method comprising:
   forming a servo pattern on the magnetic layer by microwave-assisted recording,
   wherein the magnetic layer is a single layer of a magnetic layer exhibiting two or more different natural ferromagnetic resonance frequencies of 30.0 GHz or more,
   the magnetic layer comprises two or more different kinds of ferromagnetic powder,
   the different kinds of ferromagnetic power have different coercive forces from each other, and
   the coercive forces are 210 kA/m or more.

2. The manufacturing method according to claim 1, wherein the two or more different kinds of ferromagnetic powder are metal oxide powders.

3. The manufacturing method according to claim 2, wherein the two or more different natural ferromagnetic resonance frequencies of the magnetic layer are 30.0 to 50.0 GHz.

4. The manufacturing method according to claim 2, wherein the metal oxide powders are ferrite powders.

5. The manufacturing method according to claim 4, wherein the two or more different natural ferromagnetic resonance frequencies of the magnetic layer are 30.0 to 50.0 GHz.

6. The manufacturing method according to claim 1, wherein the two or more different natural ferromagnetic resonance frequencies of the magnetic layer are 30.0 to 50.0 GHz.

* * * * *